Dec. 24, 1968   J. B. COPPEDGE   3,417,714
METHOD OF MANUFACTURING CANDY
Original Filed May 16, 1966   2 Sheets-Sheet 1
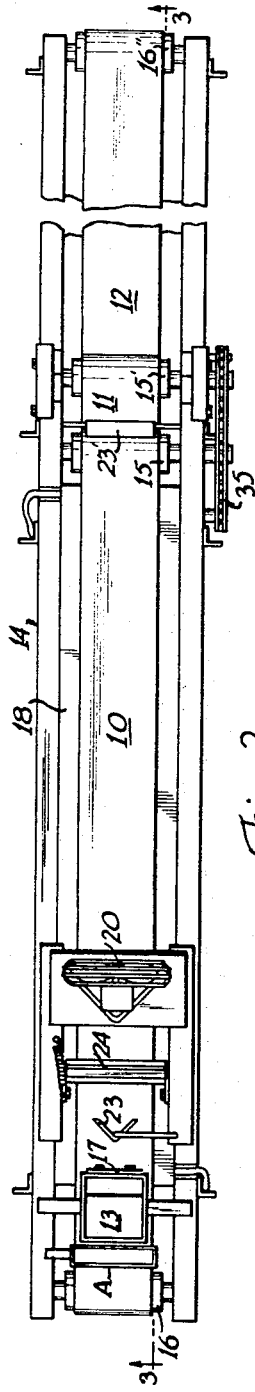
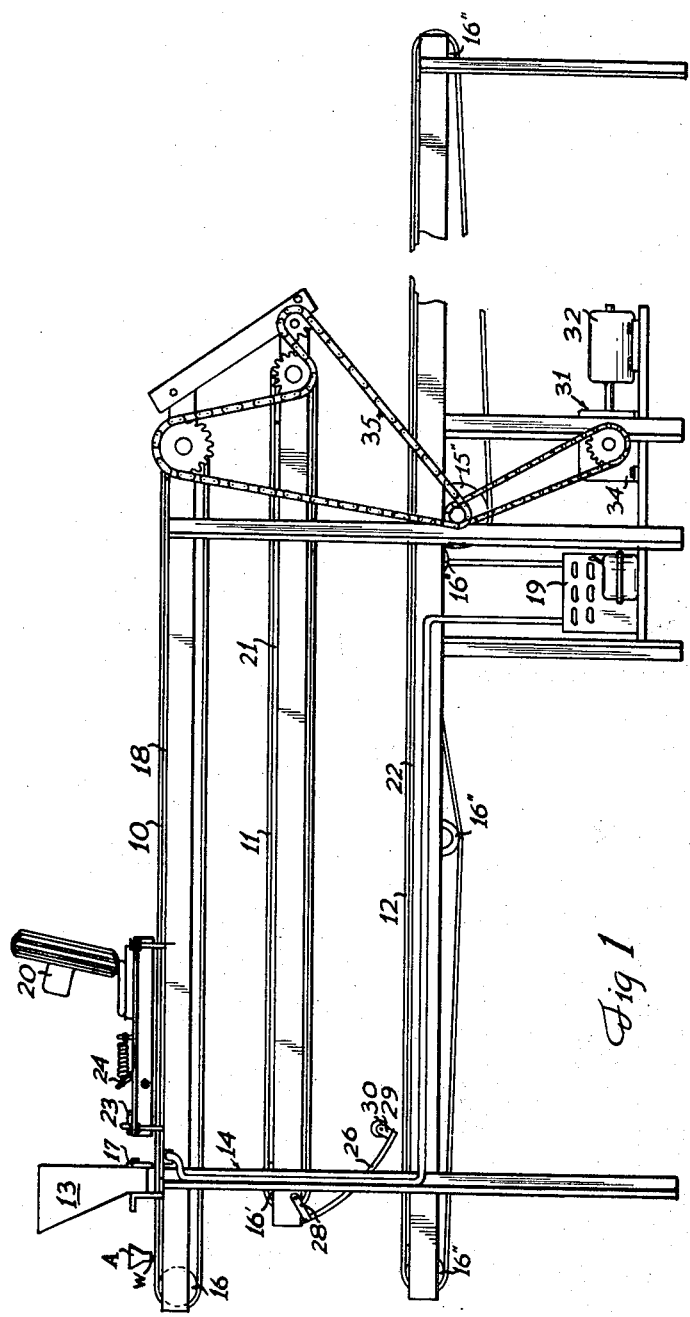
INVENTOR
John B. Coppedge
ATTORNEYS Dec. 24, 1968  J. B. COPPEDGE  3,417,714
METHOD OF MANUFACTURING CANDY
Original Filed May 16, 1966  2 Sheets-Sheet 2

INVENTOR
John B. Coppedge

Newton, Hopkins,
Jones & Ormsby
ATTORNEYS

United States Patent Office 3,417,714
Patented Dec. 24, 1968

3,417,714
METHOD OF MANUFACTURING CANDY
John B. Coppedge, Atlanta, Ga., assignor to Sophie Mae Candy Corporation of Georgia, Atlanta, Ga., a corporation of Georgia
Original application May 16, 1966, Ser. No. 550,449, now Patent No. 3,333,554, dated Aug. 1, 1967. Divided and this application Oct. 13, 1966, Ser. No. 586,527
4 Claims. (Cl. 107—54)

ABSTRACT OF THE DISCLOSURE

A method of manufacturing peanut brittle made from a mixture comprising nut meats and syrup including sugar, corn syrup, and bicarbonate of soda. The method comprises depositing the mixture on a flat surface, continuously cooling the mixture until the syrup solidifies about the nut meats, and during the cooling of the mixture, continually turning the mixture over and momentarily holding the mixture in an upwardly extending plane as it is turned over to stretch the mixture under the force of gravity until the syrup portion of the mixture is approximately one half the thickness of the nut meats and until the syrup portion of the mixture solidifies at a position approximately mid way of the thickness of the nut meats of the mixture.

---

This application is a division of my co-pending application Ser. No. 550,449, filed May 16, 1966, for "Method and Apparatus for Manufacturing Peanut Brittle" now Patent No. 3,333,554.

In the manufacture of peanut brittle, a mixture of sugar, corn syrup and peanuts is cooked for a predetermined time, bicarbonate of soda is then added whereupon the mixture is poured onto a surface in a thin sheet where it is cooled and becomes hard. It is necessary to stretch this thin layer of heated mixture during the cooling thereof in order that the resulting peanut brittle is of a uniform consistency producing a readily edible product, and it is also necessary that this thin layer of brittle be turned over during the cooling process so that the candy portion is properly dispersed as the binding agent between the nut portion which defines the thickness of the resulting peanut brittle and thus prevents the candy portion comprised of the corn syrup and sugar of the brittle from settling to the bottom of the layer and creating an undesirable appearance.

Previously, the making of peanut brittle has been done manually which has required considerable manual effort of a large labor force. Moreover, using manual labor to stretch the peanut brittle resulted in some portions of the brittle being properly stretched to insure ready edibility while other portions thereof were improperly stretched to an improper consistency. The resulting prior art product, consequently has not been completely satisfactory.

The present invention overcomes these and other problems associated with prior art methods of an apparatus for producing peanut brittle in that all of the brittle is properly stretched as well as being turned over a sufficient number of times to insure that the candy portion of the brittle does not settle to the bottom layer.

The method of the invention comprises generally the steps of depositing a heated mixture of peanut brittle on a surface and discharging the mixture from the surface under the force of gravity so that substantially uniform stretching of the mixture takes place to render the mixture easily edible. The mixture is also turned over during the stretching thereof to prevent the candy portion of the mixture from settling to the bottom of the resulting layer of peanut brittle and creating an undesirable appearance. The mixture is also cooled while on the surface so that the proper temperature at which the mixture can be stretched is attained before the stretching thereof occurs. After stretching, the mixture is cooled to room temperature whereupon it is packaged.

The apparatus of the invention comprises generally a first belt which transports the heated mixture of peanut brittle over a cooling tank and under a forced stream of air to rapidly cool the mixture, a second belt driven at a slightly higher speed than the first belt and positioned below the first belt so that the mixture of peanut brittle is stretched under the force of gravity as it passed from the first belt to the second belt while being simultaneously turned over as it passes therebetween; and a third belt which is driven at a slightly greater speed than the second belt and positioned below the second belt so that the mixture of peanut brittle is further stretched under the force of gravity between the second belt and the third belt while simultaneously being turned over as it passes therebetween.

These and other features and advantages of the invention will become more clearly understood upon consideration of the following specification and accompanying drawings wherein like characters of reference designate corresponding parts throughout and in which:

FIG. 1 is a side elevational view of one embodiment of the invention;

FIG. 2 is a top plan view of that embodiment of the invention shown in FIG. 1.

Figure 3:
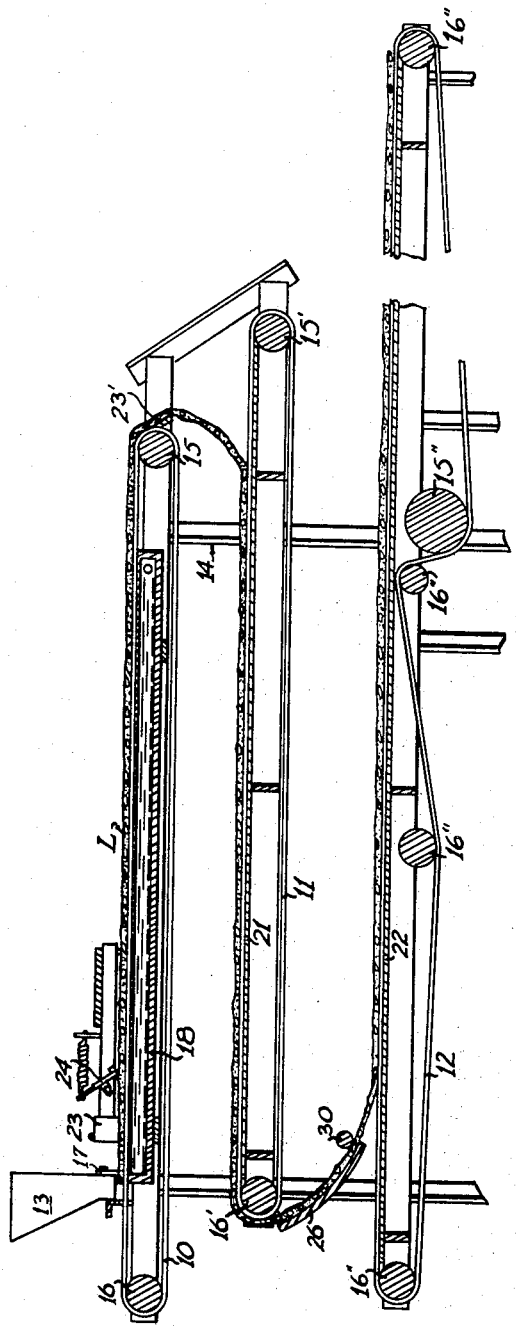
FIG. 3 is a cross-sectional view taken along the line 3—3 of FIG. 2 showing the stretching of the peanut brittle as it passes between the first and second belts and the second and third belts.

These figures and the following detailed description disclose one specific embodiment of the invention, however, the inventive concept is not limited thereto since it may be embodied in other equivalent forms.

Referring to FIGS. 1 and 2, it will be seen that the apparatus of the invention comprises generally a first belt 10, a second belt 11, and a third belt 12 rotatably or movably mounted in a frame 14. The first belt 10 is rotatably carried by a driven roll 15 and an idler roll 16 mounted in the frame 14. In this particular embodiment of the invention, the belt 10 is a thin Teflon coated fiberglass belt which does not readily adhere to the heated peanut brittle mixture, it being understood that other belts may be used to achieve the same results. The first belt 10 must, however, be relatively thin in order to conduct heat away from the layer of peanut brittle mixture as it passes therealong.

The first belt 10 passes over and is supported by a cooling tank 18 having a liquid refrigerant circulated therethrough from a conventional refrigeration unit 19. The cooling tank 18 is effective to cool the heated layer of peanut brittle mixture deposited on the first belt 10 from the bottom thereof as it passes over the cooling tank 18. A fan 20 is positioned over the first belt 10 and directs a forced flow of air on top of the heated layer of peanut brittle mixture deposited on the first belt 10 to cool the mixture from the top portion thereof. This combined cooling effected by the fan 20 and the cooling tank 18 is effective to rapidly cool the heated layer of peanut brittle mixture deposited on the first belt 10. It is to be understood, however, that the first belt 10 may be enclosed to permit refrigerated cooling on all sides thereof.

A hopper 13 deposits the heated layer of peanut brittle mixture on the first belt 10 and is position at that end adjacent the idler roll 16 since the top flight of the belt 10 moves from the idler roll 16 to the driven roll 15. A distribution plate 17 mounted on the lower front edge of the hopper 13 distribtues the heated layer of peanut brittle mixture out over the belt 10. Positioned a short distance down the belt 10 from the hopper 13 is a V-shaped plow 23 fixedly carried by the frame 14 to further distribute the mixture deposited on the belt 10 by the hopper 13. A weighted Teflon coated spreader 24 is pivotably mounted on the frame 14 a short distance down the belt 10 from the plow 23 and is effective to spread the heated layer of peanut brittle mixture deposited on the belt 10 into a layer of uniform thickness. The spreader 24 is adjustably spring urged downwardly toward its lowermost position so that it is effective to properly spread the mixture uniformly at all times.

A commercially available releasing agent is applied to the first belt 10 just prior to the depositing of the mixture of peanut brittle thereon to assist in reducing the tendency of the mixture to stick thereto as it is cooled. An applicator A having a wick W is used to apply the releasing agent to the belt 10 in conventional manner.

The second belt 11 is rotatably mounted on a driven roll 15' and an idler roll 16', and the upper flight thereof extending between the rolls 15' and 16' is supported on a support table 21 carried by the frame 14. The second belt 11 may be made of the same material as the belt 10 or any other commercially available food belt material since it is not required that this belt conduct any substantial amount of heat from the layer of peanut brittle mixture deposited thereon from the first belt 10. The rolls 15' and 16' position the top surface of the second belt 11 approximately eight inches below and aligned under the top surface of the first belt 10. One end of the second belt 11 extends slightly beyond the driven roll 15 so that the layer of peanut brittle mixture on the first belt 10 is deposited on the second belt 11 as the belt 10 passes over the driven roll 15. An appropriate scraper 23' is positioned adjacent the first belt 10 as it passes over the driven roll 15 to insure separation of the heated layer of peanut brittle mixture from the first belt 10 to cause it to drop into the second belt 11.

The second belt 11 is driven in the opposite direction to that of the first belt 10 so that the layer of peanut brittle mixture on the first belt 10 is turned over as it falls from the first belt 10 to the second belt 11. The second belt 11 is driven at a speed approximately 20% faster than the first belt 10 so that the amount that the layer of peanut brittle stretches in falling from the first belt 10 to the second belt 11 is compensated for and removed by the second belt 11, it being understood that different amounts of stretching may occur with different distances between the first and second belts 10 and 11. It is also to be understood that the higher rate of travel of the second belt 11 may assist in the stretching of the peanut brittle as it passes from the first to the second belt.

The third belt 12 is rotatably mounted on a driven roll 15" and a plurality of idler rolls 16" and aligned with and below the second belt 11. The upper flight of the third belt 12 extending between the rolls 16" is carried on a support table 22 attached the frame 14 so that the belt 12 will not sag under the weight of a layer of peanut brittle mixture. The upper surface of the third belt 12 is mounted approximately twelve inches below the upper surface of the second belt 11 so that the layer of peanut brittle mixture on the second belt 11 will be stretched as it drops from the end of the second belt 11 and onto the third belt 12. The third belt 12 is driven in the direction opposite to that of the second belt 11 and at a speed approximately 40% greater than that of the second belt 11 so that the amount that the layer of peanut brittle mixture stretches in dropping from the second belt 11 to third belt 12 is compensated for and removed by the third belt 12. The third belt 12 is substantially longer than the first or second belt 10 or 11 and discharges the layer of peanut brittle to a packaging area. By the time the layer of peanut brittle reaches the end of the third belt 12, it has hardened sufficiently to be broken into smaller chunks and packaged for shipping.

The driven roll 15" is located approximately midway the return flight of the third belt 12 and a pair of idler rolls 16" maintain driving contact between the belt 12 and the roll 15" so that when the driven roll 15" is rotated, the belt 12 is driven.

Positioned between the discharge end of the belt 11 and the upper flight of the belt 12 is a curved transfer plate 26 having mounting ears 28 thereon for adjustable attachment to the frame 14. The transfer plate 26 is effective to slidably receive the layer of peanut brittle mixture thereon as it is discharged from the end of the second belt 11. This is effective to perclude the middle of the layer of mixture from sagging due to the higher temperature thereof. A roller bracket 29 is carried at the lower end of the transfer plate 26 and rotatably mounts a hold down roll 30. This insures contact between the layer of mixture and the third belt 12 at a point in the vicinity of the discharge end of the transfer plate 26. Since the belt 12 is moving at a substantially greater speed than the second belt 11, the belt 12 assist in further stretching the layer of peanut brittle mixture in addition to the stretching produced by gravity during the transfer of the layer of mixture between the second and third belts 11 and 12.

A driving unit 31 including a conventional motor 32 and transmission 34 drivingly engages the driven rolls 15, 15' and 15" through an approximate chain and sprocket arrangement 35. The driving unit 31 is effective to rotate the driven roll 15' oppositely to the driven rolls 15 and 15" so that the belt 11 is driven oppositely to the belts 10 and 12.

*Operation*

In operation of the apparatus to perform the method of the invention it will be seen that a pre-cooked mixture of sugar, corn syrup, peanuts and bicarbonate of soda is deposited in a layer L at approximately 300° Fahrenheit on the upper flight of the first belt 10 from the hopper 13 at that end of the belt 10 opposite the driven roll 15. As the layer L of peanut brittle mixture is transported along the upper flight of the first belt 10, it is spread by the plow 23 and spreader 24 into a relatively thin layer approximately 5/16 inch in thickness or approximately the diameter of the peanuts in the layer.

As the layer L travels with the first belt 10, it passes over the cooling tank 18 which cools the bottom of the layer and under the forced air blast from the fan 20 which cools the top of the layer. By the time it reaches the driven roll 15, the layer L is approximately 200° Fahrenheit, which is the best temperature at which to stretch the mixture.

As the belt 10 passes around the driven roll 15, the scraper 23' removes the layer L of peanut brittle mixture from the first belt 10 and causes it to drop downwardly onto that end of the second belt 11 disposed under the driven roll 15. As the layer L drops from the first belt 10 to the second belt 11, it stretches approximately 20% under the force of gravity and is turned over as it falls on the second belt 11. It is to be understood that a transfer plate arrangement similar to the plate 26 may be used to assist in the transfer of the layer L between the belts 10 and 11.

The second belt 11 transports the stretched layer L of the peanut brittle mixture along to allow the ambient atmosphere to cool the mixture while the candy portion of the mixture which is now on top of the layer L settles toward the bottom thereof. As the layer L travels along the second belt 11, the ambient atmosphere cools the layer until it is approximately 190° Fahrenheit by the time it reaches the end of the second belt 11. It is to be understood, however, that the second belt 11 may also be enclosed and cooled in a manner similar to the first belt 10.

As the second belt 11 passes over the idler roll 16", the layer L of peanut brittle mixture thereon is discharged onto the concave surface of the transfer plate 26 and slides therealong while being stretched under the force of gravity. The transfer plate 26 assists in preventing the sag of the middle of the layer L normally encountered during the transfer thereof since the edges of the layer L cool more rapidly than the middle thereof.

The layer L is discharged from the plate 26 onto the upper flight of the third belt 12, and the roll 30 serves to hold the layer L against the plate 26 and insures contact between the upper flight of the belt 12 and the layer L. The belt 12 assists in stretching the layer L so that the total stretching of the layer L between the second belt 11 and the third belt 12 is approximately 40%. The layer L of peanut brittle mixture also is turned over during passage between the second belt 11 and the third belt 12 so that the candy portion of the peanut brittle which settled to the bottom of the layer L on the second belt 11 now is on the top of the layer of peanut brittle on the belt 12 and tends to settle toward the bottom thereof as it moves along the third belt 12 where it is cooled by the ambient atmosphere therearound, it being understood of course the third belt 12 may also be enclosed and cooled mechanically in a manner similar to the belt 10.

By the time the candy portion of the layer L of peanut brittle mixture has settled to approximately midway of the layer of peanuts in the peanut brittle, it is sufficiently cooled to hold the candy portion of the layer L approximately midway the layer as defined by the peanuts of the peanut brittle. In this condition, the final layer thickness of the candy portion has been stretched to approximately one-half its original thickness or $5/32$ inch while the peanuts are still approximately $5/16$ inch in diameter. The layer L of peanut brittle mixture further passes along the belt 12 and is cooled to room temperature whereupon it is broken up into small chunks for packing.

It will be seen that in the use of the apparatus herein disclosed the steps of depositing a layer of peanut brittle mixture onto a surface and subsequently stretching the layer under the force of gravity is accomplished. Moreover, the steps of turning the layer over and cooling the layer are also accomplished by the disclosed apparatus. The layer is approximately 200° Fahrenheit when stretched and is cooled from the bottom by the cooled belt and from the top by forced convection. From this, it will be understood that the method of the invention may be practiced by apparatus other than the specific apparatus disclosed without departing from the inventive concept disclosed herein.

It will be obvious to those skilled in the art that many variations may be made in the embodiments herein chosen for the purpose of illustrating the invention without departing from the scope thereof as defined by the appended claims.

What is claimed as my invention is:

1. A method of manufacturing candy made from a mixture including a heated syrup and nut meats, said method comprising:
   continuously depositing a layer of said mixture at a first temperature onto a portion of a continuous surface,
   moving the portion of the first continuous surface at a first speed in a first direction,
   cooling said mixture as it moves with the portion of the first continuous surface,
   simultaneously transferring said mixture from the portion of the first surface to a portion of a second continuous surface disposed below said first surface and turning said mixture over,
   moving the portion of the second surface in a second direction, opposite to the first direction, and at a speed greater than the first speed,
   simultaneously transferring the mixture from the portion of the second surface to a portion of a third continuous surface disposed below the second surface and turning said mixture over,
   moving the portion of the third surface in a third direction, opposite to the second direction, and at a greater speed than the second speed.

2. A method of manufacturing peanut brittle utilizing a heated mixture of peanuts, sugar, corn syrup, and bicarbonate of soda, including the steps of depositing a layer of said mixture onto a first surface, transferring said layer from said first surface to a second surface a predetermined distance under the force of gravity, stretching said layer as it is transferred to said second surface, transferring said stretched layer on said second surface to a third surface a distance greater than said predetermined distance under the force of gravity, stretching said layer as it is transferred to said third surface, turning said layer over during transfer between said first and second surfaces and during transfer between said second and third surfaces, cooling said layer after it has been deposited on said first surface from the bottom thereof by said first surface and from the top thereof by forced convection to approximately 200° Fahrenheit, cooling said mixture on said second and third surfaces to approximately room temperature, moving said first and said second surfaces in opposite directions and moving said second surface and said third surface in opposite directions.

3. A method of manufacturing candy made from a mixture including heated syrup and nut meats, comprising:
   depositing the mixture on a flat surface,
   continuously cooling the mixture until the syrup solidifies, and
   during the cooling of the mixture continually turning the mixture over and momentarily holding the mixture in an upwardly extending plane as it is turned over to stretch the mixture under the force of gravity until the syrup portion of the mixture is approximately one half the thickness of the nut meats and until the syrup portion of the mixture solidifies at a position approximately mid way of the thickness of the nut meats of the mixture.

4. A method of preparing candy from a mixture of heated syrup and nut meats comprising:
   depositing the mixture onto a laterally extending surface, cooling the mixture to solidify the syrup, and while the mixture is being cooled, continually stretching the mixture and turning the mixture over until the syrup portion of the mixture is of a thickness less than the thickness of the nut meats and until the nut meats of the mixture bulge from both surfaces of the syrup.

References Cited

UNITED STATES PATENTS 1,700,303   1/1929   Bauer _____ 107—54 X
3,009,427   11/1961  Bell _____ 107—54

WALTER A. SCHEEL, Primary Examiner.

JOSEPH SHEA, Assistant Examiner.

U.S. Cl. X.R.

264—288